(12) United States Patent
Furman (10) Patent No.: US 8,792,590 B2
(45) Date of Patent: Jul. 29, 2014

(54) COMMUNICATIONS DEVICE WITH IN-PHASE/QUADRATURE (I/Q) DC OFFSET, GAIN AND PHASE IMBALANCE COMPENSATION AND RELATED METHOD

(75) Inventor: William Nelson Furman, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 863 days.

(21) Appl. No.: 12/392,199

(22) Filed: Feb. 25, 2009

(65) Prior Publication Data

US 2010/0215125 A1  Aug. 26, 2010

(51) Int. Cl.
*H04L 25/06* (2006.01)
*H04L 27/38* (2006.01)

(52) U.S. Cl.
CPC ............ *H04L 25/06* (2013.01); *H04L 27/3872* (2013.01); *H04L 27/3863* (2013.01)
USPC ........... 375/319; 375/316; 375/346; 455/296; 455/114.2; 341/118; 370/277; 348/726

(58) Field of Classification Search
USPC ............... 375/319, 316, 346; 455/296, 114.2; 341/118; 370/277; 348/726
See application file for complete search history.

(56) References Cited

U.S. PATENT DOCUMENTS

| 5,705,949 | A  | * | 1/1998 | Alelyunas et al. | 329/304 |
| 6,317,589 | B1 | * | 11/2001 | Nash | 455/245.2 |
| 7,248,625 | B2 |   | 7/2007 | Chien | 375/219 |
| 7,433,298 | B1 |   | 10/2008 | Narasimhan | 370/208 |
| 7,965,988 | B2 |   | 6/2011 | Cole et al. | |
| 7,974,593 | B2 |   | 7/2011 | Cole et al. | |

(Continued)

FOREIGN PATENT DOCUMENTS

| EP | 1 133 066 | 9/2001 | ............ H04B 1/40 |
| WO | WO 2007/020845 | * 2/2007 | |
| WO | 2008/009007 | 1/2008 | ............ H04L 27/26 |

OTHER PUBLICATIONS

Coulson, "*Narrowband Interference in Pilot Symbol Assisted OFDM Systems*," IEEE Transactions on Wireless Communications, vol. 3, No. 6, Nov. 1, 2004, pp. 2277-2287.

(Continued)

*Primary Examiner* — Leila Malek
(74) *Attorney, Agent, or Firm* — Allen, Dyer, Doppelt, Milbrath & Gilchrist, P.A.

(57) ABSTRACT

A DC offset estimator and removal circuit removes the DC offsets for each of the I and Q signal components in a received signal. A gain imbalance estimator and compensator circuit estimates and compensates for gain imbalances within the I and Q signal components. A phase imbalance estimator and compensator circuit estimates and compensates for phase imbalances within the I and Q signal components to produce a communications signal that is compensated for received DC offsets and gain and phase imbalances within the I and Q signal components.

16 Claims, 8 Drawing Sheets

(56) References Cited

U.S. PATENT DOCUMENTS

| | | |
|---|---|---|
| 8,018,990 B2 | 9/2011 | Lee et al. |
| 8,077,797 B2 | 12/2011 | Sorrells et al. |
| 8,229,023 B2 | 7/2012 | Sorrells et al. |
| 8,279,975 B2 | 10/2012 | Caruthers et al. |
| 8,340,225 B2 | 12/2012 | Khoshgard et al. |
| 2006/0079195 A1* | 4/2006 | Beamish et al. ............. 455/313 |
| 2006/0270375 A1* | 11/2006 | Beamish et al. ............. 455/311 |
| 2007/0058738 A1* | 3/2007 | Mahadevappa et al. ...... 375/260 |
| 2008/0025381 A1 | 1/2008 | Lee et al. ...................... 375/219 |
| 2008/0069258 A1* | 3/2008 | Arad ............................ 375/260 |
| 2008/0123785 A1* | 5/2008 | Lebron et al. ................ 375/345 |
| 2008/0158433 A1 | 7/2008 | Yun et al. |
| 2008/0215180 A1* | 9/2008 | Kota ............................. 700/236 |
| 2009/0135970 A1* | 5/2009 | Miyagi et al. ................ 375/345 |
| 2010/0215125 A1 | 8/2010 | Furman |

OTHER PUBLICATIONS

Batra, et al., "*Narrowband Interference Mitigation in OFDM System*," Military Communications Conference, IEEE, Nov. 16, 2008, pp. 1-7.

Laster et al., "*Interference Rejection in Digital Wireless Communications*," IEEE Signal Processing Magazine, vol. 14, No. 3, May 1, 1997, pp. 37-62.

* cited by examiner

COMMUNICATIONS DEVICE WITH IN-PHASE/QUADRATURE (I/Q) DC OFFSET, GAIN AND PHASE IMBALANCE COMPENSATION AND RELATED METHOD

FIELD OF THE INVENTION

The present invention relates to communications, and more particularly, this invention relates to a communications device that receives and processes in-phase (I) and quadrature (Q) components in communications signals and compensating for inaccuracies created by DC offsets and gain and phase imbalances.

BACKGROUND OF THE INVENTION

Figure 1:
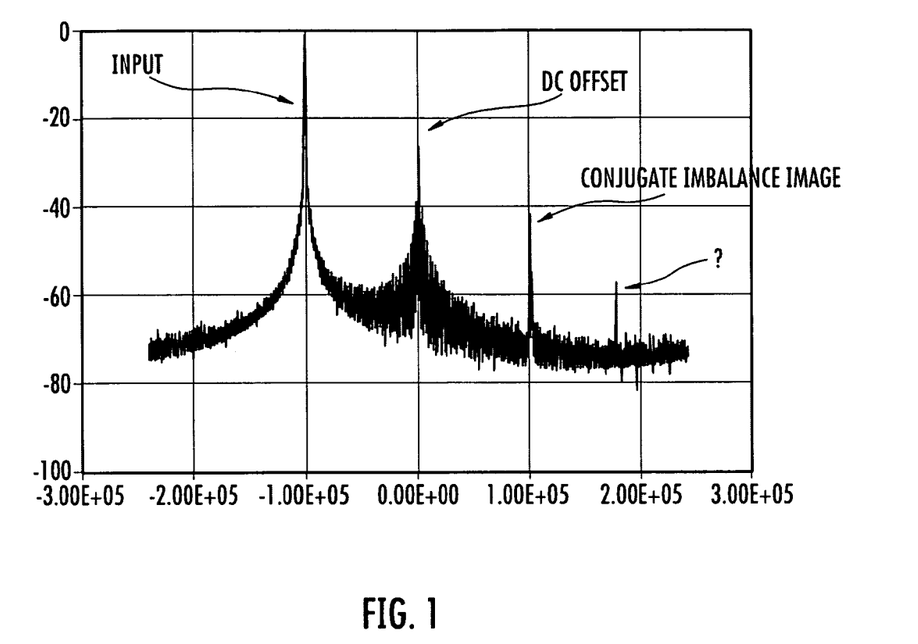
FIG. 1 is a graph of a received signal showing the input signal, DC offset signal and conjugate imbalance image signal as processed in a prior art receiver such that an NBI filter would process all the signals as illustrated.

Some handheld radios such as a Secure Personal Radio (or Soldier Personal Radio) manufactured by Harris Corporation under the designation RF-7800S use a low cost in-phase/quadrature demodulator or similar demodulator device that has processing difficulties resulting from I/Q DC offsets and I/Q gain and phase imbalances in the received signal. FIG. 1 is a graph showing the output output spectrum of such a device when the input is a constant wave (CW) tone. The output spectrum includes an input, DC offset and conjugate imbalance image signal. As illustrated, there are a number of other signals besides the input signal shown at −100 kHz. The graph shows a DC offset at 0 Hz in the middle and a conjugate imbalance image at +100 kHz on the other side from the −100 kHz input signal. The question mark indicates a spur signal.

These other signals as part of the output signal spectrum, including those created by the I/Q DC offsets, I/Q gain imbalance and I/Q phase imbalance, degrade overall performance of a narrowband interferer (NBI) excision filter and associated filtering process typically incorporated as signal processing before demodulation. A preferred received signal, on the other hand, would have a flat spectrum except for at the input signal located −100 kHz on FIG. 1, for example.

The incorporation of the NBI excision filter is important because more commercial, national, and international users of these types of radios are migrating to the use of wideband networking waveforms such as the Soldier Radio Waveform (SRW), the Wideband Networking Waveform (WNW) and the Advanced Networking Wideband Waveform (ANW2) as non-limiting examples. These waveforms operate, for example, in bandwidths typically of about 5 MHz. These types of modern communication systems and radios as described operate in wider bandwidths in order to support the higher data rates desired by these more advanced users. Thus, the use of the NBI excision filter is important for processing signals prior to the demodulating of these waveforms.

An NBI excision filter can process a received communications signal such as shown in FIG. 1 that includes these described multiple, narrowband signals. Its processing and its performance, however, is compromised. The narrowband interferer excision filter works better when a fewer number of narrowband signals are processed. As shown in FIG. 1, for example, there are three signals when preferably there should only be one signal to process within the NBI excision filter. As a result, the performance in this narrowband interferer excision filter is degraded.

Some systems minimize the signal degradation that occurs in a narrowband interferer excision filter by using very high quality parts and associated high power parts, which are incorporated into better radio frequency (RF) designs. Although this would work in some cases, the device cost of design and manufacture is increased. Other designs work on the transmitted signal. For example, it is possible at the transmitter to use Cavers algorithms as a transmitter based compensation to improve the quality of a transmit signal. This type of algorithm works by exploring grid nodes using the Dijkstra algorithm in which each node is evaluated using a path search algorithm. The drawback, of course, is that this occurs only at the transmit side and not the receive side. Some proposed techniques process received samples to reduce related images and improve the narrowband interferences excision filter performance. For example, Roke Manor Research Ltd. has a receiver design that eliminates only DC offset. This type of design would not compensate for gain and phase imbalance.

It would be better to develop an integrated receiver design and process that receives signal samples before the narrowband interferer excision filtering occurs and reduce the components that are generated by a low cost I/Q demodulator chip. Further performance could be improved because there are fewer narrowband signals for the NBI filter to process. It is desirable to eliminate the related narrowband signals so that in effect the NBI excision filter sees only one signal to filter instead of the multiple signals as shown in FIG. 1, showing the DC offset and conjugate image that comes from the gain and phase imbalance.

SUMMARY OF THE INVENTION

A communications device and related method receives a communications signal and includes an analog-to-digital converter and sampler circuit through which the communications signal is received and sampled to obtain input samples of in-phase (I) and quadrature (Q) signal components, possibly through the use of a low-cost Quadrature demodulator device. A DC offset estimator and removal circuit receives I and Q signal components and estimates and removes the DC offsets for each of the I and Q signal components. A gain imbalance estimator and compensator circuit receives the I and Q signal components from the DC offset estimator and removal circuit and estimates and compensates for gain imbalances within the I and Q signal components. A phase imbalance estimator and compensator circuit receives the I and Q signal components from the gain imbalance and estimator and removal circuit and estimates and compensates for phase imbalances within the I and Q signal components to produce a communications signal that is compensated for received DC offsets and gain and phase imbalances within the I and Q signal components. A narrowband interferer excision (NBI) filter receives the I and Q signal components after compensating for received DC offset and gain and phase imbalances and has adaptive complex taps that eliminate remaining narrowband signal components.

The DC offset estimator and removal circuit is operative for estimating an average over "n" samples and subtracting the estimated average from a middle sample. It can estimate the average by repeatedly moving over one sample in averaging. The gain imbalance estimator and compensator circuit is also operative for removing gain imbalances using a filtered accumulation of power adjustment for the I and Q signal components. It can obtain a power adjustment of I and Q signal components that are tracked to balance power. The phase imbalance and compensator circuit can be operative for accumulating a filtered sum of the product of the I and Q signal components that result in an arcSine for the phase imbalance and updating the Q signal component to adjust for a non pi/2 phase difference.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In a desired communications scenario, a received tone signal is received within a receiver, for example, a software-defined radio. It is processed at the receiver and into the in-phase (I) and quadrature (Q) signals. A signal as received in a desired format with little interferers would ideally have no DC offsets on either of the I/Q signals and there would be no gain imbalance and no phase imbalance on the I/Q signals. The in-phase (I) signal would be the cosine of 2ΠFt and the quadrature would be the sine of that signal.

In practical real world applications, the received tone signal in the communications receiver scenario such as shown in the received signal of FIG. 1 includes the imbalances in phase gain and a DC offset and are modeled differently as described below.

The received tone signal can be modeled as (with Imb corresponding to Imbalance) and I corresponding to In-phase and Q corresponding to Quadrature.

$$I = \text{gain} Imb * \cos(2\Pi Ft) + IDc\text{Offset}$$

$$Q = \sin(2\Pi Ft + \text{phase} Imb) + QDc\text{Offset}$$

In accordance with a non-limiting example, the receiver as a communications device operates with several process steps for compensating gain and phase imbalance and DC offset that are accomplished in the order as indicated:

1) Take I and Q input samples from the A/D converter;
2) Estimate and remove DC offsets (IDcOffset, QDcOffset);
3) Estimate and compensate for I/Q gain Imbalance (gainImb); and
4) Estimate and compensate for I/Q phase Imbalance (phaseImb).

The order of the above processing steps is not constrained but the order described has proven to be the most effective in practice. By first removing the DC offsets a much better estimate of the Gain imbalance can be achieved. Following the estimate of gain imbalance the final estimate of any remaining phase imbalance can be calculated and compensated for.

The I/Q DC offset removal uses a sliding window, for example, with a length=16, as an average calculated and subtracted from a center value. This approach was shown to give good results, but other methods of estimating the DC offsets could also be used. The I/Q gain imbalance compensation uses a filtered accumulation of $E=I^2(Q*adj)^2$. The adjustment is tracked to balance power $adj'=adj+K*E$. This approach was also shown to give good results, but other methods of estimating the gain imbalance could also be used. As to the phase imbalanced signal, the I/Q phase imbalance compensation uses a filtered accumulation of I*Q which can provide ArcSine (phaseImb). This is used to update the Q component to adjust for a non Π/2 phase difference.

These models and approach show that there will be imbalances for both the phase and gain and the DC offsets with the phase imbalance for Q and a gain imbalance for I. When removing the DC offset, the receiver processor takes an average over 16 samples and subtracts the average off of the middle sample. Everything slides over by one sample and the processor repeats this process again, thus estimating an average. Ideally, a processor may estimate the average of the signal value and that will be the DC value. Although the use of a sliding window length of 16 can vary, that number has been found to work well. If the sliding window is too long, receiver processing would not be as responsive and would not subtract values out well. The length of the DC offset estimator would ideally be as long as possible, however it was found that by making the length fairly short, therefore allowing the estimate to be more of a short term estimate, that some of the variation of DC offset, likely due to device phase noise, could also be eliminated. This has the secondary advantage in that if there is a sudden change in DC offset, for any reason, the system will fairly quickly adapt to the new level.

The I/Q gain imbalance compensation is accomplished in a technique that looks at the difference in power between the I and the Q. As shown by the formula above for the filtered accumulation, the quadrature has an adjustment (ADJ) that aids in compensating for the error. This would feed a tracking loop as part of the processing and drive itself to zero, which means it would be imbalanced. In this subsystem, the instantaneous imbalance error is calculated as $E=I^2-(Q*adj)^2$, if the I and Q gains were balanced this error signal E would be zero. This is accomplished by use of the following tracking loop $adj'=adj+K*E$ where with each sample (in our implementation) the adjustment gain, adj is updated based on a filtered version of the error signal E. It can be seen that if there is no error, E=0, the gains are balanced and there is no further change in the adjustment gain. Alternatively, if the adjusted Q samples (adj*Q) are larger than the I samples, the resulting error signal E will become negative and the tracking loop will lower the adjustment gain. Alternatively, if the I samples are larger than the adjusted Q samples, the resulting error signal will be positive and the tracking loop will increase the adjustment gain. One additional note is that there are numerous ways to track and compensate for the gain (and phase) imbalances, the methods presented were designed for the optimality in implementation for FPGA or DSP based systems as there are minimal divides, or complicated functions such as square root. The in-phase component as I is squared minus the Q multiplied by the adjustment and squared. The power is basically the I component squared and then subtracted off the Q phase component that is squared. The adjustment is tracked to balance the power. The new adjustment which could be considered an adjustment prime (adj') is equal to the old adjustment plus some scale factor (k) multiplied by the error (E) signal.

Figure 3:
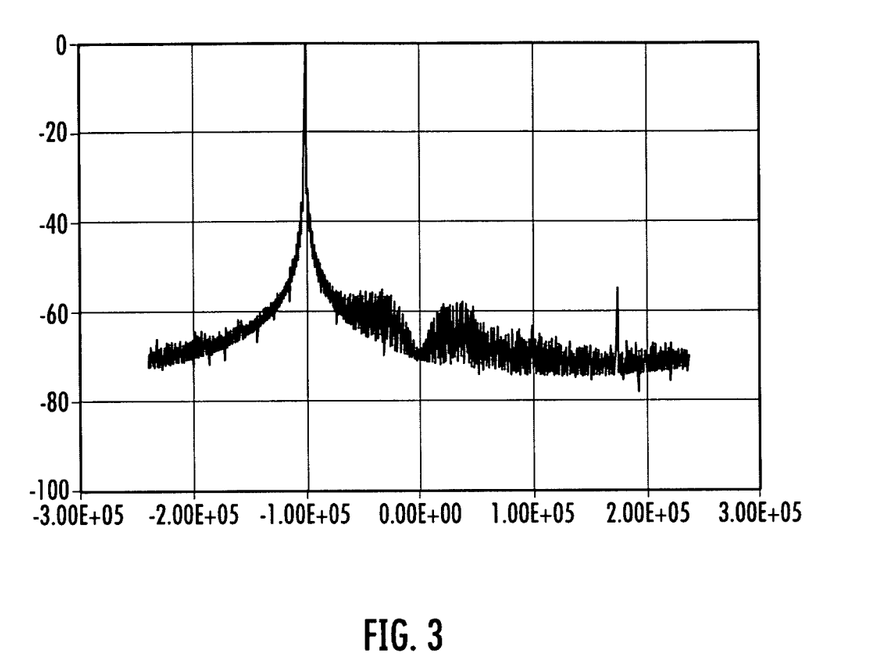
FIG. 3 is a graph showing the results modeled from the device design shown in FIG. 2 and showing compensation such that only the input signal at −100 kHz remains for further processing in the NBI excision filter.

In terms of the I/Q phase imbalance compensation, the I and Q samples are multiplied and mathematically this results in the arcsine of the phase imbalance. This result is used to update the quadrature (Q) component to adjust for a non Π/2 phase difference. This results because the I/Q demodulator chips include a multiplier for the cosine and a multiplier for the sine and typically should be 90 degrees out of phase. The graphs shown in FIG. 3 show results of that process used on a signal such as would be received as in the signal of FIG. 1 in which the DC component and conjugate shown in the graph of FIG. 1 are reduced to −70 dB.

The components used for the processing as described above can use signal processing that is implemented in the VHDL (VHSIC hardware description language) used as a design-entry language for Field-Programmable Gate Arrays (FPGA's) and Application-Specific Integrated Circuits (ASIC). VHDL is a specification language used to describe a hardware design that is configured in a device such as a FPGA or ASIC. Typically C, a processor based programming language, is not used although some vendors are releasing products that allow for the specification of the programmable hardware designs in a C similar manner. Different entities could be used as a design to describe an interface and an architecture with different configurations. MUX templates, latch templates, different types of flip flops, counters and different constructs can be used with different register transfer levels.

There are several advantages to the receiver as a communications device and method as described. The receiver methodology can be implemented with low MIPS receiver processing as a microprocessor without interlocked pipeline stages as a RISC processor architecture, for example. DC offsets and other images are minimized that relate to narrowband interference, which otherwise, if present, would degrade overall NBI filter performance. This process could also be a key component to good narrowband jamming performance on a low cost radio platform.

Although different narrowband interferer (NBI) excision filters can be used, one NBI filter design that is advantageous has basic aspects described below and described in copending patent application Ser. No. 11/871,174 filed Oct. 12, 2007, and Ser. No. 12/062,550 filed Apr. 4, 2008, the disclosures which are hereby incorporated by reference in their entirety.

Figure 2:
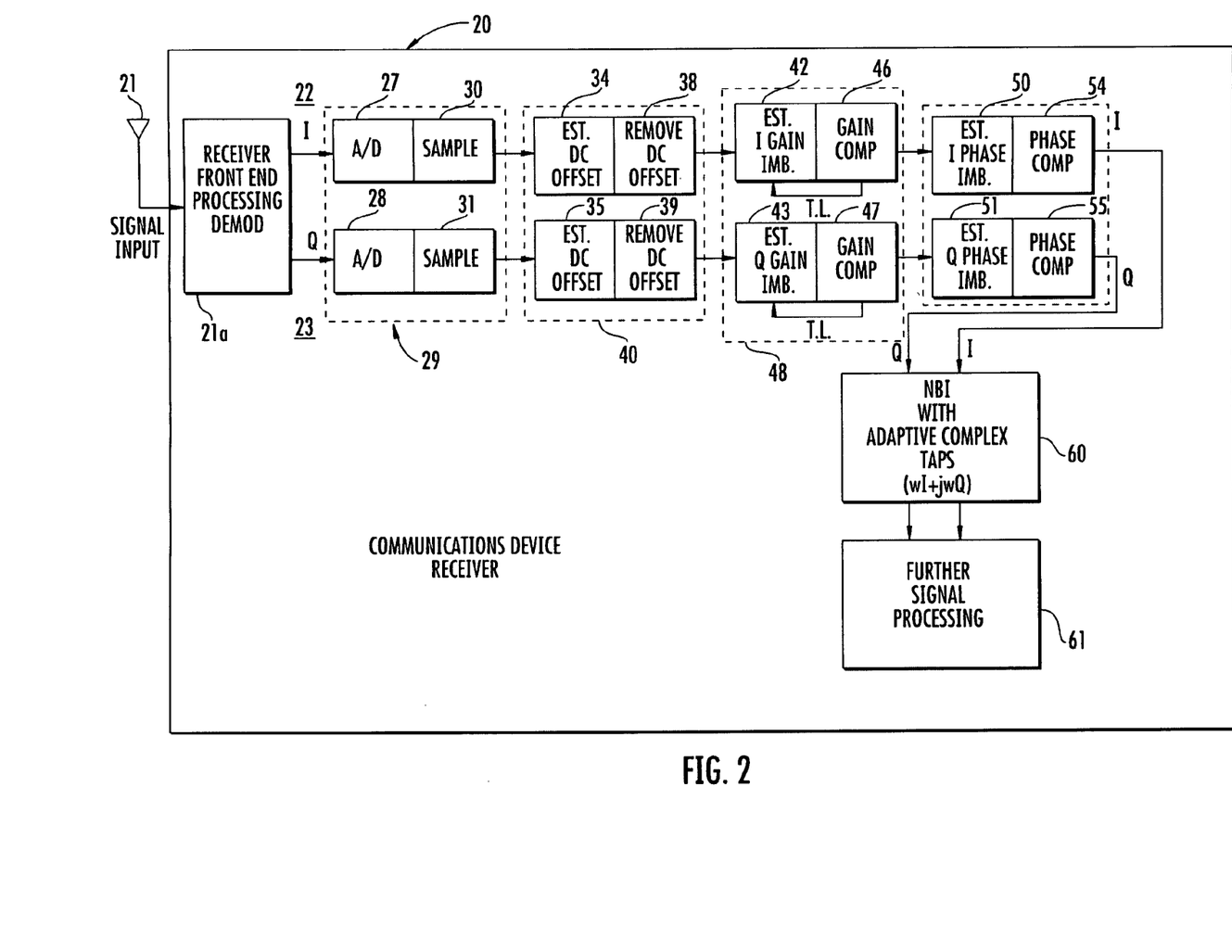
FIG. 2 is a block diagram of components used in a communications device in accordance with a non-limiting example of the present invention that provides for improved narrowband interferer excision filtering to compensate for I/Q offset, gain imbalance and phase imbalance.

FIG. 2 is a block diagram showing basic components used in a receiver as a communications device that could process a received signal as shown with the multiple signals of FIG. 1, in accordance with a non-limiting example as described above. The communication signals are received within a receiver 20 through, for example, an antenna 21 into a signal input and processed as I and Q signals in I and Q signal paths 22, 23 as shown in FIG. 2. Respective I and Q A/D converters 27, 28 in an analog-to-digital converter and sampler circuit 29 process the I and Q signals and convert the signals. A sampler circuit 30, 31 within each path samples the signals from the A/D converters 27, 28. Of course, these components could be one or separate circuits.

The signal is passed through the signal input into the receiver front-end processing 21a that could include typically components before any type of DC offset removal and correction and sampling such as some input demodulators and other filter components. As illustrated with the analog-to-digital converters 27, 28 and sampling circuits 30, 31, quadrature sampling could be used in which a sampling frequency is greater or four times the IF frequency. This can allow quadrature mixing to extract I and Q signal components such as by a multiply of the signal with only a series of ones and minus ones and zeros.

The Fourier transform of a real signal g(t) is a complex function of radian frequency, $G(w)=Gr(w)+I*Gi(w)$. $G(w)$. The real part is an even function, i.e., $Gr(w)=Gr(-w)$. It is imaginary part is an odd function, i.e., $Gi(w)=-Gi(-w)$. The signal can be constructed from one half of the bandwidth. If g(t) has a bandwidth B and G(w) has non-zero components from $-2pi*B$ to $+2pi*B$, half of that frequency range is unique.

In quadrature demodulation, the signal spectrum is taken from 0 to $2pi*B$, i.e., from $2pi*(fc-B/2)$ to $2pi*(fc+B/2)$, which corresponds to some bandwidth around a carrier fc and shifted down so that it is centered about 0 radians/second. Because the signal extends to B/2 Hz, the sampling rate is halved and it does not violate the Nyquist criterion. The resulting time-domain signal is no longer real because the symmetry between positive and negative frequencies is no longer guaranteed.

With each path, a DC offset estimation circuit 34, 35 is programmed to estimate the DC offset and the DC offset is removed in respective DC offset removal circuits 38, 39 as part of a DC offset estimator and removal circuit 40. The I/Q gain imbalance is estimated in respective I and Q gain imbalance estimation circuits 42, 43 each followed by the respective I and Q gain imbalance compensation circuits 46, 47 for compensating for the I and Q gain imbalance as part of the gain imbalance and compensator circuit 48. The tracking loop (TL) is illustrated. This is followed by estimating the I/Q phase imbalance in respective phase imbalance estimation circuits 50, 51 and compensating for the I/Q phase imbalance in respective I/Q phase imbalance compensation circuits 54, 55 as part of the phase imbalance and component circuit 56. These components as described could be programmed using VHDL in FPGA's or ASIC's or other processors.

After those series of steps, the signal is processed by a narrowband interferer (NBI) excision filter 60 as shown followed by further signal processing 61 to obtain communications data. As noted before, different NBI excision filters can be used, but one preferred filter is described below. Also described are a communication system and radio device that can be used and modified for use with the process as described.

Figure 4:
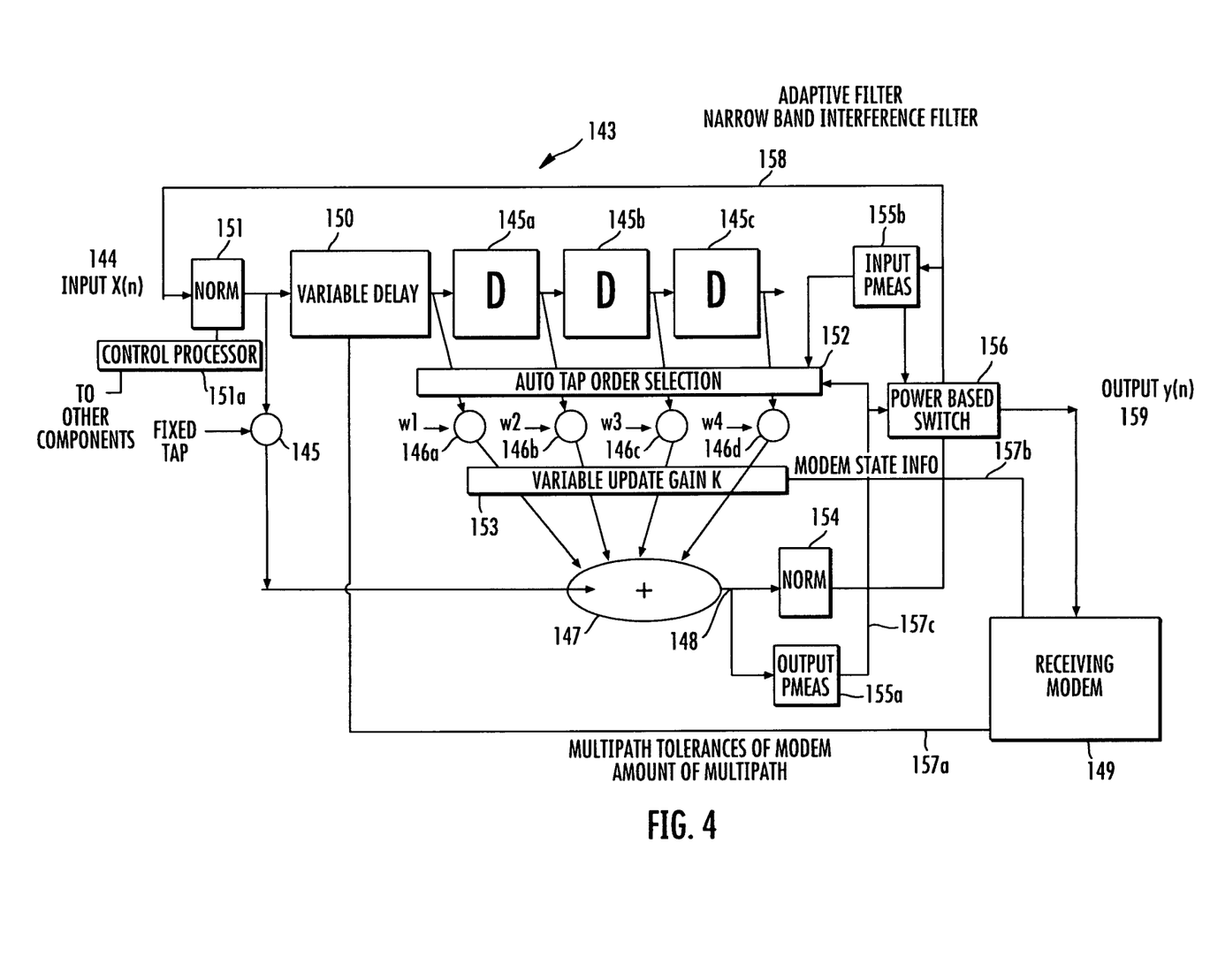
FIG. 4 is a block diagram showing an adaptive filter as a narrowband interferer excision filter that can be used with the device shown in FIG. 2.

The narrowband excision filter 60 shown in FIG. 2 can be formed as an adaptive filter, e.g., a narrowband interference (NBI) (or narrowband) filter as shown in detail in FIGS. 4 and 5 and further explained below. The NBI filter 60 has I and Q inputs and outputs. The NBI filter is a complex filter with an I and Q phase input and I and Q phase output. It contains adaptive complex taps, such as (W/+jWQ), which it sets up to eliminate narrowband signal components.

Although an adaptive filter as a Finite Impulse Response (FIR) filter is preferred, the adaptive filter could be formed as an Infinite Impulse Response (IIR) filter. In one embodiment, an additional variable delay between the fixed and adaptive taps is included. This delay improves multipath performance by making the multipath resolvable for the channel estimation algorithms and equalizers used in demodulator circuit. Because the input power of the adaptive filter relative to the output power of the adaptive filter is a good indicator of interference suppression, this power can be measured and information fed back to control a variable delay before the adaptive taps and to control an automatic tap order selection circuit.

A large single interferer or jammer is often best handled by one or two taps (less taps reduces ISI introduced by adaptive filter), and the number of taps can be chosen or updated to accommodate signal changes, such as the appearance of a large interferer or jammer. The adaptive filter uses the state of the receive modem (i.e., demodulator) to select an adaptive update gain, while a variable delay is placed between the fixed and adaptive taps. An automatic application of the adaptive filter can be based on the measured output power by bypassing the adaptive filter or selecting the output of the adaptive filter. The tap order selection can be based automatically on the modulation of the data portion of waveform and the adaptive filter state. The variable adaptive gain can be based on the demodulator state such as the preamble search, preamble, data and also on the waveform modulation of data portion of waveform.

Selected non-limiting parameters can include a gain with the variables of $\frac{1}{2}^7$, $\frac{1}{2}^3$ and $\frac{1}{2}^{10}$, and the total number of taps can vary from as few as one to about 3 to 6 in a non-limiting example. The number of adaptive taps can vary from 1 to 4 in another non-limiting example. The system provides multiple, delayed taps (spaced at the symbol rate of modulated waveform) that are adaptive after a first fixed tap in one embodiment and an automatic in/out filter selection based on the output power of the adaptive filter. The order or number of taps can be automatically selected based on the output power of the adaptive filter. An adaptive update gain can be based on the receive state of the modem, including the search, preamble and data and the modulation such as GMSK (Gaussian Minimum Shift Keying), BPSK (Binary Phase Shift Keying), QPSK (Quadrature Phase Shift Keying), M-PSK (M-ary Phase Shift Keying) and M-QAM (M-ary Quadrature Amplitude Modulation, i.e. 16-QAM).

It should be understood that the adaptive filter uses the characteristics of the input signal. Typically, the adaptive filter, for example, an adaptive FIR filter, has a self-learning process and the adaptive algorithm is selected to reduce the error between the output signal and a desired signal. One algorithm is the Least Mean Squares (LMS) algorithm that approximates the steepest descent algorithm to use an instantaneous estimate of a gradient vector of a cost function. It should be understood that other algorithms such as RLS or MMSE algorithms can be used. For description, the LMS algorithm is described as a non-limiting example.

The filter changes or adapts its parameters in response to changes in the operating environment such that the output can track a reference signal with minimum error as coefficients are changed. The equalizer can be operated in a training mode and a tracking mode. Channel characteristics can be learned for a first time in a training mode, while in the tracking mode, the characteristics of the channel are followed, assuming they do not change quickly. A specially chosen training signal could be applied to the channel input and is presumed to be known to the equalizer. In a tracking mode, while actual communication occurs, the signal is unknown to the equalizer, FIG. 4 illustrates a block diagram of an adaptive filter 143 for use in various examples of the communications device as described above and which can be modified for the I and Q signal inputs. An example of such adaptive filter is also set forth in commonly assigned U.S. patent application Ser. Nos. 11/871,174; 11/871,184; 11/871,208; 11/871,224; 11/871,203; 11/871,180; and 11/871,189; the disclosures which are hereby incorporated by reference in their entirety. Although the filter is illustrated as a Finite Impulse Response (FIR) Filter, it can be designed as an Infinite Impulse Response (IIR) filter. The adaptive filter 143 includes an input X(n) 144 and appropriate delay elements 145a-c (illustrated as three delay elements) and four weighted taps 146a-d and outputs that are summed within a summer 147. Other delay elements with appropriate weighted coefficients can possibly be used. A fixed tap 145 is included as illustrated before adaptive taps and could include one or more fixed taps, typically one. The output Y(n) 148 from the summer 147 is subsequently received within a receiving modem 149.

In accordance with a non-limiting example, a variable delay circuit 150 is incorporated between fixed and adaptive taps as illustrated. The input 144 is also passed through an input normalizer circuit 151 that can be controlled by a control processor 151a before reaching the variable delay circuit 150. An automatic tap order selection circuit 152 is incorporated within the filter as well as a variable update gain circuit 153. From the summer 147, the output 148 is passed through an output normalizer circuit 154, which can be controlled by the control processor 151a, and an output power measuring circuit 155a. Input power can be measured at an input power measuring circuit 155b. A power-based switch 156 at the output allows the input signal 144 to be switched either directly to the receiving modem 149 or through the adaptive filter by means of a bypass channel 158.

The receiving modem 149 can include a feedback channel 157a to carry information concerning the multipath tolerances of the modem and information about the amount of multipath back to the variable delay circuit 150. The power-based switch 156 allows switching between the filter and the input as illustrated. Modem state information as explained below is fed back through a feedback channel 157b to the variable update gain circuit 153. The power measuring circuit 155a feeds back information regarding the power output from the filter to the power-based switch 156 and the automatic tap order selection circuit 152 through feedback channel 157c. Input power as measured by power measuring circuit 155b is fed to the automatic tap order selection circuit 152 and power-based switch 156.

A delay can be provided between the fixed and adaptive taps to improve multipath performance and make the multipath resolvable. Because the input power and output power of the filter is a good indicator of the interference suppression, the filter can be automatically applied based on the output power while automatic tap order selection occurs based on modulation used for data and the filter state. The power based switch permits automatic selection of the signal path either through the filter or through a bypass channel 158 to an output 159 as illustrated. The filter also automatically determines an optimum number of adaptive taps dependent on the filter performance and modulation and can adjust the update gain of the filter based on the modem state, data modulation, etc.

The variable delay circuit 150 makes the multipath more discernable and differentiates multipath when it is next to each other by separating the multipath because the equalizer function as a whole tends to perform better if there is greater spacing between the multipath (as long as multipath does not exceed multipath capability of equalizer or channel estimation algorithms). The automatic tap order selection circuit 152 recognizes that it is possible to perform the job with a required number of taps, for example, one or two taps, which may be better suited for different jamming or interfering signals. It is possible to select one or the other or more, or any combination. This structure and function is advantageous if the system is attempting to remove one or two different jamming signals. Thus, the minimum number of taps can be used effectively.

The power measuring circuit 155 feeds back power information into the automatic tap order selection circuit 152, allowing the number of taps to be chosen based on the power output of the filter. Power is a good metric or indicator of how well the filter is working and how much suppression is actually obtained. This can be obtained by measuring the ratio of the output power to the input power, giving an indicator whether the filter is removing jammers. It is possible to look at these relative powers and decide which one of the taps (filters), such as the one or two taps, is the best one to choose.

The variable update gain circuit 153 permits updating of the taps by obtaining feedback of demodulator state information from the receiving modem through the feedback channel 157b. This information allows an adaptive update gain based on the received state of the modem (i.e. whether demodulator is in the preamble search state, preamble state and data state) and the type of modulation used to carry data, such as GMSK, BPSK, QPSK, M-PSK and M-QAM.

As noted before, the power based switch 156 switches the signal between the bypass and the filter output. For example, if the output power is about the same as the input power, the filter is not accomplishing any real suppression and the switch is operable such that the signal is bypassed into the top bypass channel 158 from the input through the power based switch 156 and output to the receiving modem 149. If the filter is operative as measured by the ratio of output power and input power using the power measuring circuit 155, the input signal is switched through the filter 143 and into the output 148 of the summer 143 and through the normalizer 154 and power measuring circuit 155. This switching function can be advantageous because even when the filter is not accomplishing much suppression, the waveform and any noise at the taps will still cause the taps to "jump" or move even a small amount and there is still some distortion imparted to the received signal. Thus, a high-level decision can occur whether the filter should be used or not.

As to the demodulator state information that is fed back to the variable update gain circuit 157 through the channel 157b, it is possible to operate the filter with different gains or different internals depending on the state of the demodulator. Typically, a demodulator will search for a waveform and will run with a particular updated gain function while searching. Once the waveform is detected, it might be possible to slow down the adaptation rate so that the system does not overmodulate or severely distort the received signal. The amount of "jumping" by the taps is decreased. For example, it is possible to run at first with a larger gain (i.e. faster adaptation), but once a signal is acquired, the gain can be made smaller (i.e. slower adaptation by using a smaller gain) so there will be less noise enhancement from the adapting filter taps.

The variable delay 150 at the front end of the adaptive filter 143 gives some separation to the multipath. The feedback from the modem allows information regarding the receiving modem's multipath tolerances and the amount of multipath and allows an adjustment in the delay such that the multipath will not become so large in its separation and extend beyond the functional multipath capability of the receiving modem 149.

In the system for each input, sample $y(n)=x(n)-w1*x(n-2-v)-w2*x(n-3-v)-w3*x(n-4-v)-w4*x(n-5-v)$. Taps are updated with each sample $w(i)=w(i)+k*x(n-i)*y(n)*$. The input/output and taps are all complex.

The normalizing circuits 151,154 receive inputs and feedback from a control or other processor and are operable with a fixed point arithmetic or logic for normalized input and output. For example, if there is a 20 dB jammer, the signal coming out of the filter will be a factor of about 100 smaller, and if using fixed-point math precision, it can be brought back up to obtain more bits and increase the gain of the samples to work better through the system. The input normalizing circuit 151 obtains sample values coming into the filter and attempts to place them in the proper range for filter fixed-point math functions to work without complicating issues.

The amount of normalizing is adjusted from a controller or other processor such that the normalizing function does not modulate data beyond what is desired. This is important depending on the type of waveform, such as a M-PSK constellation, constant amplitude waveform, or a M-QAM constellation. The controller or other processor could operate with a memory function to remember the last gain given to the samples coming out of the normalizing circuit, including the input and output normalizing circuits 151, 154, allowing a small change relative to the signal. It is possible to allow an automatic gain control (AGC) circuit to make some changes on a sample or block basis. There are some sensitivities to changes in amplitude and the normalizing circuits are operable that any M-QAM signal having data or information contained in the amplitude of the waveform is not affected. Any AGC loop could be on both the memory and the input and output normalizing circuits. Any control signal from a controller or other processor could include information relating to the modulation type and demodulator state.

Overall, the adaptive filter will accomplish better performance if there is greater spacing between the multipath and the variable delay circuit 150 provides such spacing. If only the first tap is used, for example, when the variable delay circuit 150 is not operable, the multipath tends to group together and the taps can move to a non-zero value if there is an interferer. As illustrated and as noted before, there are three or four taps in the filter operable to attack three or four interferers. If only one or two taps are desired and used such that the number of taps are reduced, then the multipath spread introduced by adaptive filter is less since it had to remove fewer interferers or jammers.

The automatic tap order selection circuit 152 takes advantage of the fact that there is not necessarily a requirement to use four taps, but three, two or one tap can be used to overcome the disadvantages of a fixed structure.

Typically, the filters as described can be implemented within a Field Programmable Gate Array (FPGA) that is fast enough to implement the modem functions of the waveform. With the improvement in digital signal processors, however, various DSP circuits could also be used.

Figure 5:
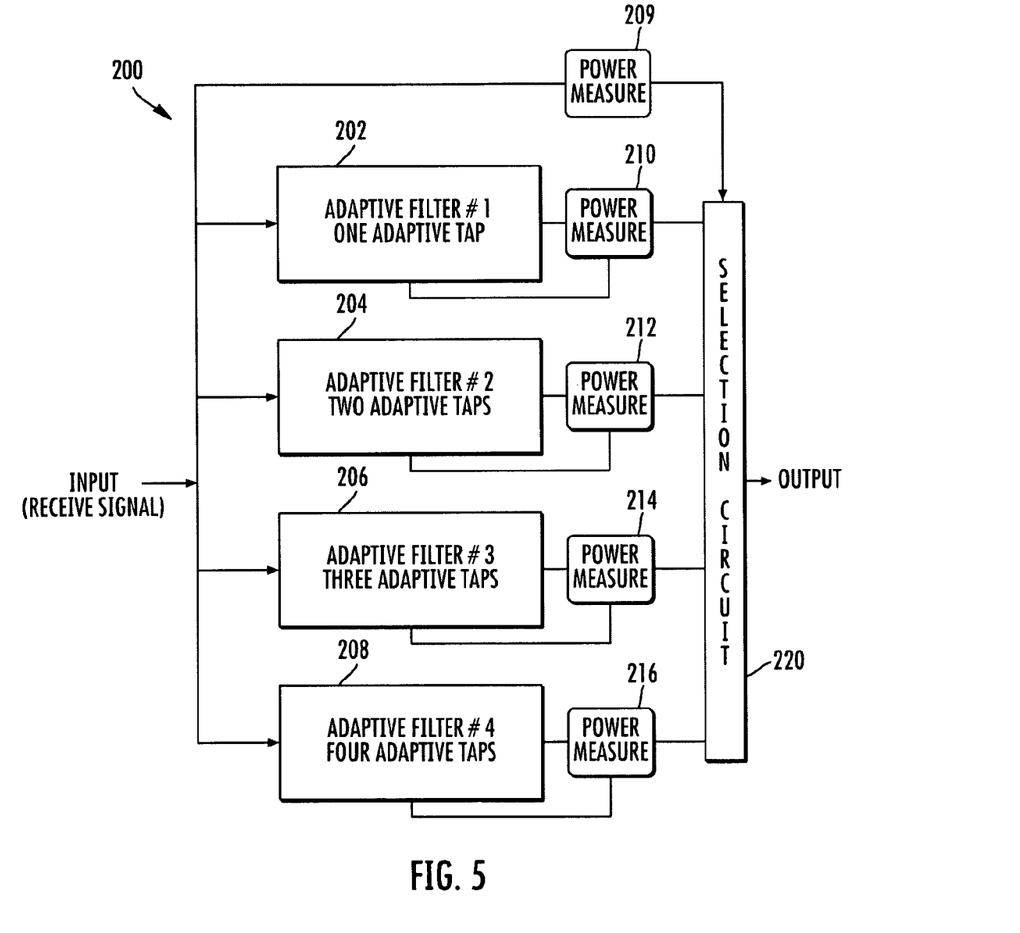
FIG. 5 is a block diagram showing a plurality of adaptive filters in parallel that could be used in the device shown in FIG. 2, each having a different number of adaptive taps such that the filter with the smallest output power or most suppression or other criterion is selected as an output.

FIG. 5 is an adaptive filter system or circuit 200 having four adaptive filters 202, 204, 206, and 208 positioned parallel. The first adaptive filter 202 has one adaptive tap. The second adaptive filter 204 has two adaptive taps. The third adaptive filter 206 has three adaptive taps. The fourth adaptive filter 208 has four adaptive taps. A power measuring circuit 209 measures the input power. Each adaptive filter has a respective power measuring circuit 210, 212, 214, and 216 with appropriate feedback of the type as mentioned relative to FIG.

2. The adaptive filters and power measuring circuit are shown in basic diagrammatic view only. Each power measuring circuit is output into a selection circuit 220 for final output. The received signal is input into each adaptive filter. The selection circuit 220 senses the output power from each adaptive filter and selects the adaptive filter with the most suppression or smallest output power as the adaptive filter to use as the output in the circuit 200.

It is possible that the system provides multiple delay taps and a variable delay at the front-end such that the first few taps do not have to be used while different delays can be used. A "one" can be used for the first filter tap and some filter taps can be skipped. The output power can be monitored as noted before such that the filter determines which branch to use and whether the input signal should be bypassed directly to output into the filter. The filter can operate with different filter taps, for example, a filter with 1, 2, 3 or 4 taps, while the power output can be monitored to determine which branch to use as noted before. The gain of the filter can be adapted based on whether the system is searching such as for a waveform and whether the system is in a preamble mode or data mode and whether a certain modulation is used. Depending on the type of signal constellation used to transmit data, much of the transmitted information is in the phase and not the amplitude (i.e. M-PSK), and thus, the system would be less likely to be hurt by faster filter update gains. If the system knows it will receive a M-QAM constellation, it could consider slowing the filter update gain and increase normalizing circuit memory after the preamble, and thus, the system can exploit what knowledge it has.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 6 and 7.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 6:
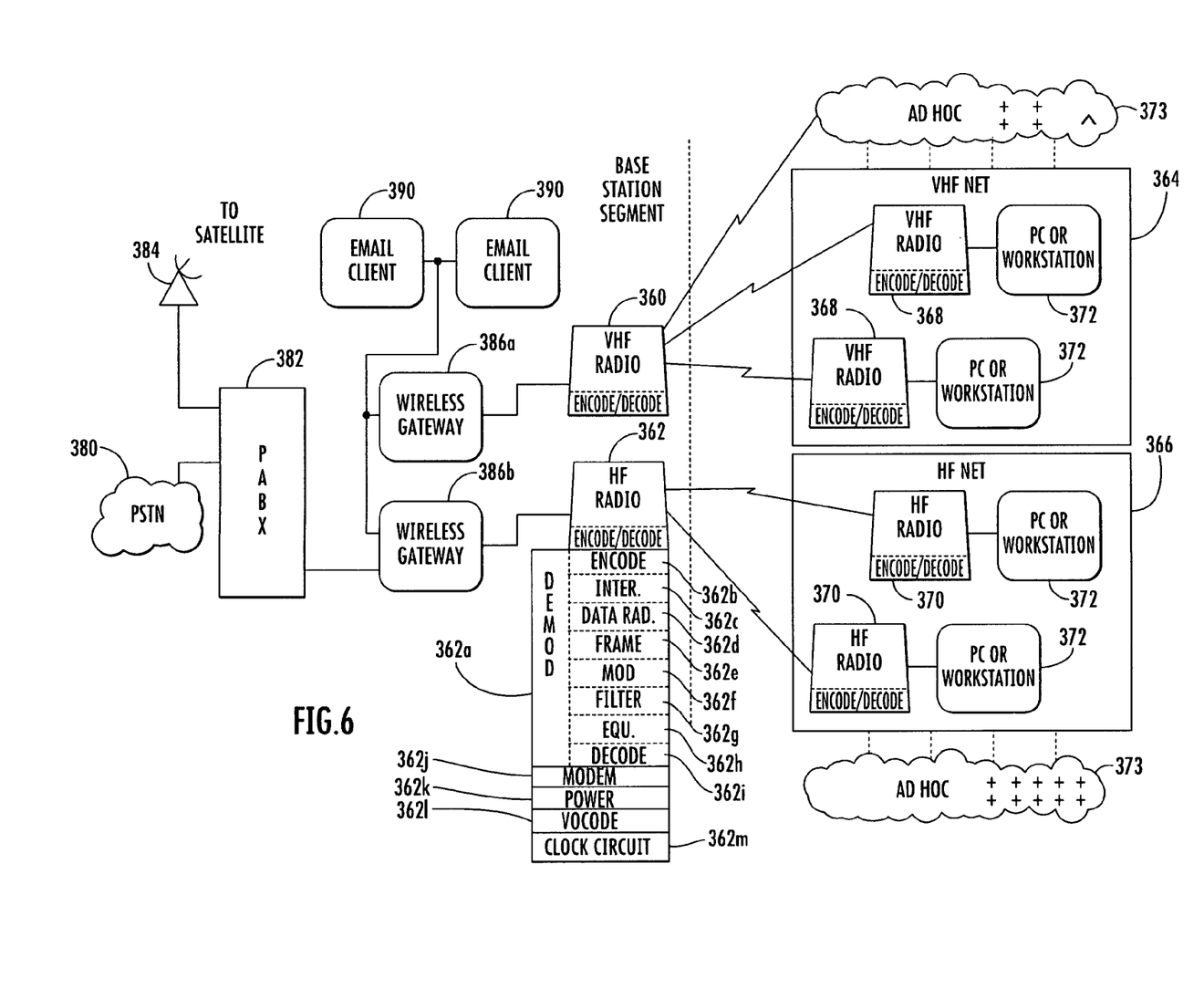
FIG. 6 is a block diagram of an example of a communications system that can be used and modified in accordance with a non-limiting example of the present invention.

For purposes of description only, a brief description of an example of a communications system that includes communications devices that incorporate the simultaneous wideband and narrowband communications in accordance with a non-limiting example, is described relative to a non-limiting example shown in FIG. 6. This high-level block diagram of a communications system includes a base station segment and wireless message terminals that could be modified for use with the present invention. The base station segment includes a VHF radio 360 and HF radio 362 that communicate and transmit voice or data over a wireless link to a VHF net 364 or HF net 366, each which include a number of respective VHF radios 368 and HF radios 370, and personal computer workstations 372 connected to the radios 368,370. Ad-hoc communication networks 373 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 362a and appropriate convolutional encoder circuit 362b, block interleaver 362c, data randomizer circuit 362d, data and framing circuit 362e, modulation circuit 362f, matched filter circuit 362g, block or symbol equalizer circuit 362h with an appropriate clamping device, deinterleaver and decoder circuit 362i modem 362j, and power adaptation circuit 362k as non-limiting examples. A vocoder circuit 362l can incorporate the decode and encode functions and a conversion unit could be a combination of the various circuits as described or a separate circuit. A clock circuit 362m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 380, which connects to a PABX 382. A satellite interface 384, such as a satellite ground station, connects to the PABX 382, which connects to processors forming wireless gateways 386*a*, 386*b*. These interconnect to the VHF radio 360 or HF radio 362, respectively. The processors are connected through a local area network to the PABX 382 and e-mail clients 390. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 7:
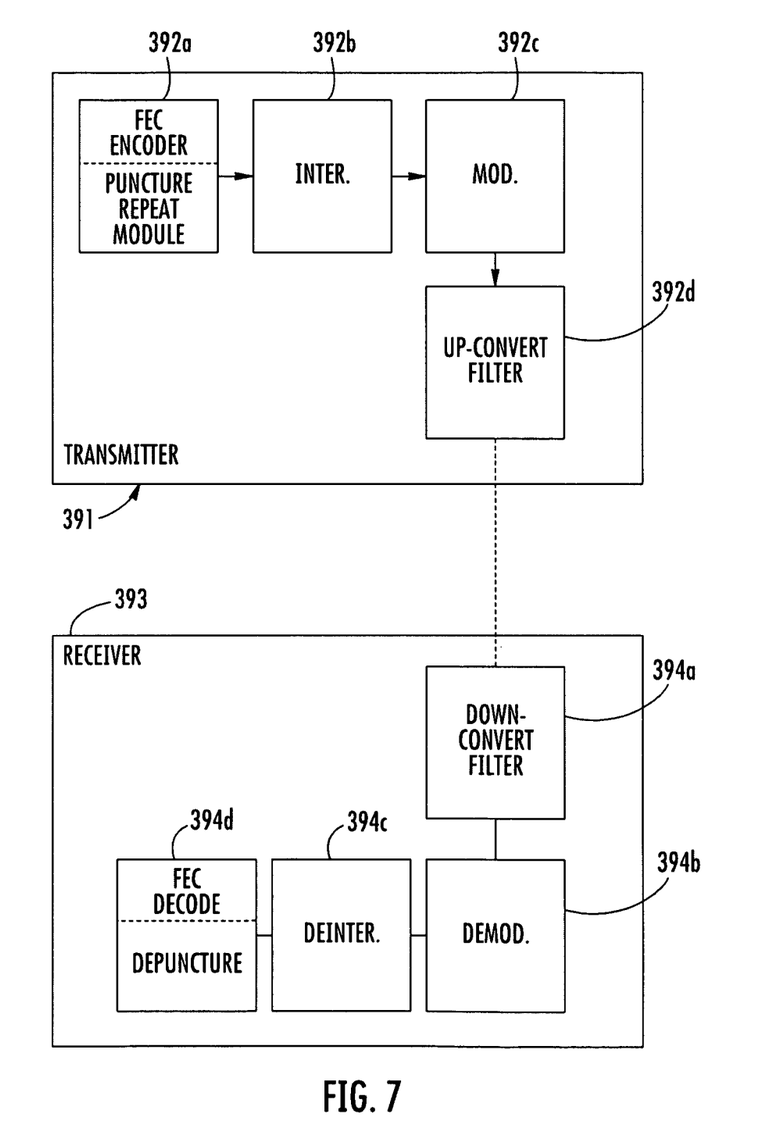
FIG. 7 is a high-level block diagram showing basic components that can be used and modified in accordance with a non-limiting example of the present invention.

A communications system that incorporates communications devices can be used in accordance with non-limiting examples of the present invention and is shown in FIG. 7. A transmitter is shown at 391 and includes basic functional circuit components or modules, including a forward error correction encoder 392*a* that includes a puncturing module, which could be integral to the encoder or a separate module. The decoder 392*a* and its puncturing module includes a function for repeating as will be explained below. Encoded data is interleaved at an interleaver 392*b*, for example, a block interleaver, and in many cases modulated at modulator 392*c*. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 392*d*, which could be formed as an integrated module or separate modules. Communications signals are transmitted, for example, wirelessly to receiver 393.

At the receiver 393, down conversion and filtering occurs at a down converter and filter 394*a*, which could be integrated or separate modules. The signal is demodulated at demodulator 394*b* and deinterleaved at deinterleaver 394*c*. The deinterleaved data (i.e. bit soft decisions) is decoded and depunctured (for punctured codes), combined (for repeated codes) and passed through (for standard codes) at decoder 394*d*, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 8:
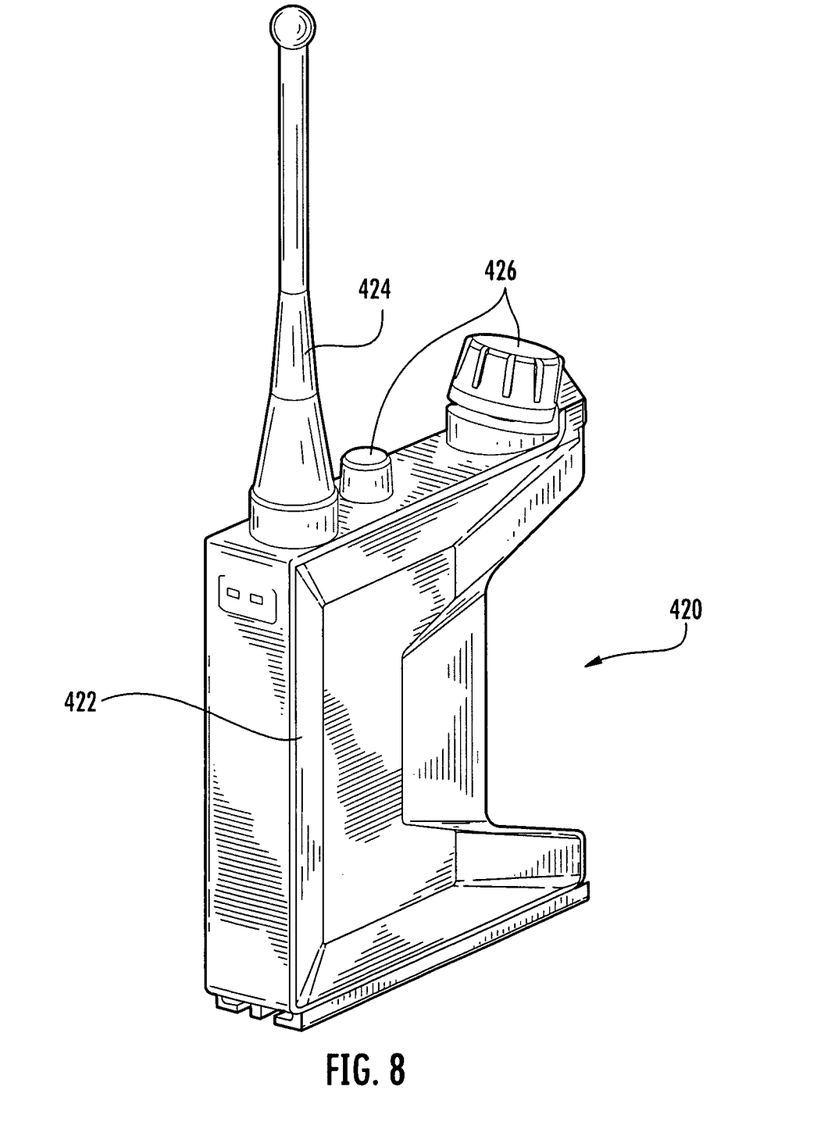
FIG. 8 is a perspective view of a portable wireless communications device as a handheld radio that could incorporate the communications system and radio as modified in accordance with a non-limiting example of the present invention.

The system, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 420 as illustrated in FIG. 8. The portable wireless communications device is illustrated as a radio that can include a transceiver as an internal component and handheld housing 422 with an antenna 424 and control knobs 426. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the system in accordance with non-limiting examples of the present invention. An example of a communications device that could incorporate the simultaneous wideband and narrowband communications in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings Therefore, it is understood that the invention is not to be limited to the specific embodiments disclosed, and that modifications and embodiments are intended to be included within the scope of the appended claims.

That which is claimed is:

1. A method of processing a communications signal having communications data, comprising:
   receiving within a radio receiver a radio frequency (RF) communications signal;
   performing a Quadrature demodulation of the communications signal to another intermediate frequency and producing In-phase (I) and Quadrature (Q) signal components;
   sampling the signal components to obtain input samples;
   estimating DC offsets for each of the I and Q signal components by estimating an average over "n" samples, wherein n is an odd number greater than 1, and subtracting the average only from a middle sample and repeating a plurality of times based on a sliding window calculation the estimating of an average over "n" samples while subtracting the average only from the middle sample to form an average estimate and updating this average estimate by adding a newly received sample to the average and subtracting off a stored sample delayed by sample periods and removing the updated average estimate of the DC offset from each of the I and Q signal components, followed by;
   estimating and compensating for gain imbalances within the I and Q signal components; and estimating and compensating for phase imbalances within the I and Q signal components to produce a communications signal.

2. The method according to claim 1, wherein the step of removing gain imbalances further comprises using a filtered accumulation of power adjustment for the I and Q signal components.

3. The method according to claim 2, which further comprises obtaining a power adjustment of I and Q signal components that is tracked to balance power.

4. The method according to claim 1, wherein the step of removing phase imbalances further comprises using a filtered accumulation of the product of the I and Q samples.

5. The method according to claim 4, which further comprises updating the Q signal component to adjust for a non $\pi/2$ phase difference.

6. The method according to claim 1, which further comprises processing the communications signal within a narrowband interferer excision (NBI) filter after compensating for received DC offsets and gain and phase imbalances within each of the I and Q signal components.

7. A communications device, comprising:
a signal input configured to receive a communications signal having communications data;
a quadrature demodulator connected to said signal input and configured to perform a quadrature demodulation of the communications signal to another intermediate frequency and provide In-phase and Quadrature (Q) signal components;
an analog-to-digital converter and sampler circuit connected to the quadrature demodulator through which the In-phase and Quadrature signal components are received from the quadrature demodulator and sampled to obtain input samples;
a DC offset estimator and removal circuit that receives I and Q signal components and estimates and removes DC offsets for each of the I and Q signal components;
a gain imbalance estimator and compensator circuit that receives the I and Q signal components from the DC offset estimator and removal circuit and estimates and compensates for gain imbalances within the I and Q signal components; and
a phase imbalance estimator and compensator circuit that receives I and Q signal components from the gain imbalance estimator and compensator circuit and estimates and compensates for phase imbalances within the I and Q signal components to produce a communications signal, wherein the DC offset estimator and compensator circuit is operative for estimating an average over "n" samples, wherein n is an odd number greater than 1, and subtracting the average only from a middle sample and repeating again a plurality of times based on a sliding window calculation the estimating of an average over "n" samples while subtracting the average only from the middle sample to form an average estimate and updating this average estimate by adding a newly received sample to the average and subtracting off a stored sample delayed by sample periods and removing the updated average estimate of the DC offset from each of the I and Q signal components.

8. The communications device according to claim 7, wherein the gain imbalance estimator and compensator circuit is operative for removing gain imbalances using a filtered accumulation of power adjustment for the I and Q signal components.

9. The communications device according to claim 8, wherein the gain imbalance estimator and compensator circuit is operative for obtaining a power adjustment of I and Q signal components that is tracked to balance power.

10. The communications device according to claim 7, wherein the phase imbalance estimator and compensator circuit uses a filtered accumulation of the product of the I and Q samples.

11. The communications device according to claim 10, wherein the phase imbalance estimator and compensator circuit is operative for updating the Q signal component to adjust for a non $\pi/2$ phase difference.

12. The communications device according to claim 7, and further comprising a narrowband interferer excision (NBI) filter that receives the I and Q signal components after compensating for received DC offsets and gain and phase imbalances.

13. A communications device, comprising:
a signal input configured to receive a communications signal having communications data;
a quadrature demodulator connected to said signal input and configured to perform a quadrature demodulation of the communications signal to another intermediate frequency and provide In-phase and Quadrature (Q) signal components;
an analog-to-digital converter and sampler circuit connected to the quadrature demodulator through which the In-phase and Quadrature signal components are received from the quadrature demodulator and sampled;
DC offset estimator and removal circuit that receives I and Q signal components and estimates and removes the DC offsets for each of the I and Q signal components;
a gain imbalance estimator and compensator circuit that receives the I and Q signal components from the DC offset estimator and removal circuit and estimates and compensates for gain imbalances within the I and Q signal components;
a phase imbalance estimator and compensator circuit that receives I and Q signal components from the gain imbalance and estimator and removal circuit and estimates and compensates for phase imbalances within the I and Q signal components to produce a communications signal; and
a narrowband interferer excision (NBI) filter that receives the I and Q signal components after compensating for received DC offsets and gain and phase imbalances and having adaptive complex taps that eliminate remaining narrowband signal components, wherein the DC offset estimator and removal circuit is operative for estimating an average over "n" samples, wherein n is an odd number greater than 1, and subtracting the average only from a middle sample and repeating again a plurality of times based on a sliding window calculation the estimating of an average over "n" samples while subtracting the average only from the middle sample to form an average estimate and updating this average estimate by adding a newly received sample to the average and subtracting off a stored sample delayed by sample periods and removing the updated average estimate of the DC offset from each of the I and Q signal components.

14. The communications device according to claim 13, wherein the gain imbalance estimator and compensator circuit is operative for removing gain imbalances using a filtered accumulation of power adjustment for the I and Q signal components.

15. The communications device according to claim 13, wherein the gain imbalance estimator and compensator circuit is operative for obtaining a power adjustment of I and Q signal components that is tracked to balance power.

16. The communications device according to claim 13, wherein the phase imbalance estimator and compensator circuit uses the filtered accumulation of the product of the I and Q samples.

* * * * *